United States Patent [19]

Salyer

[11] Patent Number: 5,765,389
[45] Date of Patent: Jun. 16, 1998

[54] COOLING UNIT WITH INTEGRAL THERMAL ENERGY STORAGE

[75] Inventor: Ival O. Salyer, 6325 Shady Knoll Dr., Dayton, Ohio 45414

[73] Assignee: Ival O. Salyer, Dayton, Ohio

[21] Appl. No.: 842,419

[22] Filed: Apr. 24, 1997

[51] Int. Cl.⁶ .................................................. F25D 17/02
[52] U.S. Cl. ................................................ 62/434; 62/437
[58] Field of Search ...................................... 62/434, 437, 4

[56] References Cited

U.S. PATENT DOCUMENTS

| | | |
|---|---|---|
| Re. 34,880 | 3/1995 | Salyer . |
| 3,156,101 | 11/1964 | McGuffey ........................... 62/434 |
| 4,111,189 | 9/1978 | Dizon . |
| 4,259,401 | 3/1981 | Chahroudi et al. . |
| 4,711,813 | 12/1987 | Salyer . |
| 4,797,160 | 1/1989 | Salyer . |
| 4,825,939 | 5/1989 | Salyer et al. . |
| 5,053,446 | 10/1991 | Salyer . |
| 5,106,520 | 4/1992 | Salyer . |
| 5,211,949 | 5/1993 | Salyer . |
| 5,228,504 | 7/1993 | Mantegazza et al. ............... 62/437 |
| 5,254,380 | 10/1993 | Salyer . |
| 5,282,994 | 2/1994 | Salyer . |
| 5,565,132 | 10/1996 | Salyer . |

OTHER PUBLICATIONS

Ival O. Salyer and Anil K. Sircar, "Phase Change Materials for Heating and Cooling of Residential Buildings and Other Applications" (Abstract)—no date.

Ival O. Salyer, Anill K. Sircar, Richard P. Chartoff, and Daniel E. Miller, "Advanced Phase–Change Materials for Passive Solar Storage Applications", Copyright 1985, Society of Automotive Engineers, pp. 3.699–3.709.

Primary Examiner—Ronald C. Capossela
Attorney, Agent, or Firm—Killworth, Gottman, Hagan & Schaeff, L.L.P.

[57] ABSTRACT

The present invention is directed to a cooling unit. The cooling unit comprises a heat exchange unit which contains a phase change material. The heat exchange unit further includes a first plurality of heat exchange conduits which are positioned in the heat exchange unit. The first plurality of heat exchange conduits are positioned in heat transfer relation with the phase change material so that the phase change material can be cooled by a coolant. The first plurality of heat exchange conduits contain a coolant. The heat exchange unit also includes a second plurality of heat exchange conduits positioned in the heat exchange unit. The second plurality of heat exchange conduits are positioned in heat transfer relation with the phase change material so that the phase change material can cool an object.

21 Claims, 2 Drawing Sheets

COOLING UNIT WITH INTEGRAL THERMAL ENERGY STORAGE

BACKGROUND OF THE INVENTION

Every day, a large amount of electric power is consumed cooling residential and commercial buildings, especially during the day time hours. Overall, a large imbalance in electric power usage exists during the day time due primarily to the large amounts of power consumed by industry, businesses and public transportation. In many locations, day time peak usage is twice that of the night hours. To compensate for the extensive day time use of electric power, utility companies provide generating capacity sufficient to supply day time usage, leaving unused capacity available for the night hours.

In order to reduce an ever expanding need for day time power, utility companies are providing incentive pricing for off-peak power usage to encourage more use of the existing surplus evening power capacity. This practice is common in Japan, in some European countries, and in a few locations in the United States.

Further, the ever increasing use of fossil fuels world wide for heating and cooling applications contributes significantly to the depletion of these irreplaceable raw materials. Additionally, the burning of fossil fuels of all kinds results in atmospheric pollution with nitrogen oxides and in higher concentrations of carbon dioxide in the atmosphere. The carbon dioxide buildup is of ever increasing concern because it may eventually result in drastic changes in global climates through global warming.

Thus, a need has arisen in the art for a cooling unit, and, in particular, an air conditioning unit, which can more efficiently cool objects, which can make effective use of utilities during off-peak hours to minimize residential and industrial power consumption and which would consequently reduce residential and industrial utility costs. Further, there is an urgent need to adopt energy conservation technologies to stretch the supply of available fossil fuels until non-polluting energy sources can be developed and implemented.

SUMMARY OF THE INVENTION

The present invention solves the currently existing needs in the art by providing a cooling unit which employs a phase change material to cool objects. The present invention can make effective use of energy during off-peak hours and can reduce both commercial and residential energy costs. Further, by using off-peak energy and by utilizing less energy, the cooling unit of this invention conserves energy.

One aspect of the present invention is directed to a cooling unit. The cooling unit comprises a heat exchange unit which contains a phase change material. The heat exchange unit further includes a first plurality of heat exchange conduits which are positioned in the heat exchange unit. The first plurality of heat exchange conduits are positioned in heat transfer relation with the phase change material so that the phase change material can be cooled by a coolant. The first plurality of heat exchange conduits contain a coolant. The heat exchange unit also includes a second plurality of heat exchange conduits positioned in the heat exchange unit. The second plurality of heat exchange conduits are positioned in heat transfer relation with the phase change material so that the phase change material can cool an object.

Desirably, the phase change material is either a melt mix polymer comprising a phase change material, a polyolefin, an ethylene copolymer and silica particles or is selected from the group consisting of linear crystalline alkyl hydrocarbons, crystalline fatty acids, crystalline fatty acid esters, crystalline 1-olefins, crystalline 1-halides, crystalline primary alcohols, crystalline alicyclic hydrocarbons, and crystalline aromatic hydrocarbons.

Another aspect of the present invention is directed to an air conditioning unit for cooling ambient air. The air conditioning unit includes a shell having an insulation material positioned to insulate the shell. The air conditioning unit also includes a heat exchange unit positioned in the shell. The heat exchange unit is positioned such that a coolant inlet, a coolant outlet, a fluid inlet and a fluid outlet are provided by the positioning of the heat exchange unit in the shell. The heat exchange unit contains a phase change material. The heat exchange unit further includes a first plurality of heat exchange tubes positioned in the heat exchange unit. This first plurality of tubes communicates with the coolant inlet and with the coolant outlet. The first plurality of tubes are in heat transfer relation with the phase change material so that the phase change material can be cooled by a coolant as the coolant is passed through the first plurality of tubes. The first plurality of heat exchange tubes contain a coolant. The heat exchange unit also includes a second plurality of heat exchange tubes positioned in the heat exchange unit. This second plurality of tubes communicates with the fluid inlet and with the fluid outlet. The second plurality of tubes are in heat transfer relation with the phase change material so that the phase change material can cool ambient air as the air is passed through the second plurality of tubes.

Desirably, the phase change material is either a melt mix polymer comprising a phase change material, a polyolefin, an ethylene copolymer and silica particles or is selected from the group consisting of linear crystalline alkyl hydrocarbons, crystalline fatty acids, crystalline fatty acid esters, crystalline 1-olefins, crystalline 1-halides, crystalline primary alcohols, crystalline alicyclic hydrocarbons, and crystalline aromatic hydrocarbons.

Accordingly, it is an object of the present invention to provide a cooling unit and an air conditioning unit which employ a phase change material to cool an object such as a fluid. This, and other objects and advantages of the present invention, will become apparent from the following drawings, detailed description and claims.

DETAILED DESCRIPTION OF THE INVENTION

Figure 1:
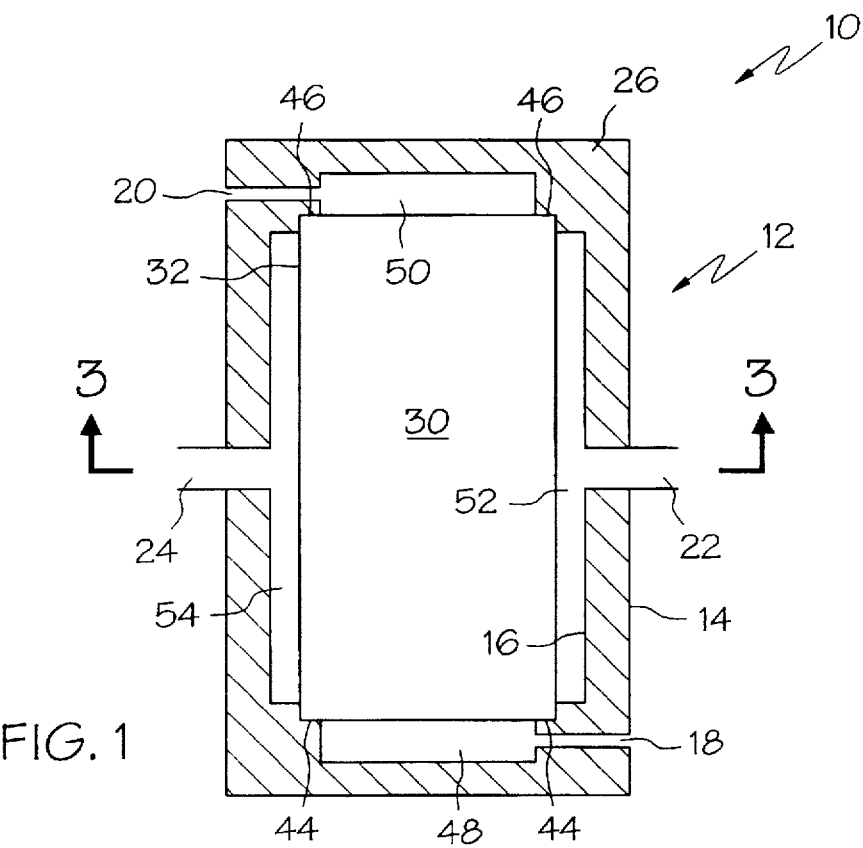
FIG. 1 presents a partial cross sectional view of the cooling unit of this invention.

A partial cross sectional view of a cooling unit 10 of this invention is shown in FIG. 1. The cooling unit 10 includes a shell 12 which has an exterior surface 14 and an interior surface 16. The shell 12 further includes a coolant inlet 18, a coolant outlet 20, a fluid inlet 22, and a fluid outlet 24. Coolant inlet 18 and coolant outlet 20 are typically positioned at opposite ends of shell 12. Fluid inlet 22 and fluid outlet 24 are typically positioned opposite each other in shell 12. An insulation material 26 is positioned in relation to shell 12 to insulate shell 12. Insulation material 26 can either be positioned on exterior surface 14 of shell 12 or between exterior surface 14 and interior surface 16 of shell 12. Desirably, as shown in FIG. 1, insulation material 26 is positioned between exterior surface 14 and interior surface 16 of shell 12. Desirably, the insulation material 26 will have an "R" value of at least about 10 and, more desirably, an "R" value of at least about 25. Useful insulation materials 26 include foams, fiberglass, polymers, and vacuum panel insulation. Desirably, the insulation material 26 will be vacuum panel insulation.

Cooling unit 10 further includes a heat exchange unit 30 positioned inside shell 12. Heat exchange unit 30 includes a shell 32. Heat exchange unit 30 is positioned in shell 12 in a manner such that the coolant is prevented from coming into contact with the fluid to be cooled. This is desirably accomplished by providing shell 12 with a first annular ledge 44 and a second annular ledge 46. Heat exchange unit 30 is positioned on first annular ledge 44 and, when shell 12 is sealed, second annular ledge 46 comes into contact with the top of heat exchange unit 30. Annular ledges 44 and 46 are desirably formed as part of shell 12 and are coated with, or have positioned thereon, a material used to form seals (not shown). For example, annular ledges 44 and 46 can be formed of a plastic material or a rubber material. Annular ledges 44 and 46 should be formed of a material which would not be degraded by either the coolant or the fluid. The positioning of heat exchange unit 30 in shell 12 provides a coolant inlet area 48, a coolant outlet area 50, a fluid inlet area 52 and a fluid outlet area 54. Coolant tubes 40 communicate with coolant inlet area 48 and coolant outlet area 50 so that coolant can flow from coolant inlet area 48 to coolant outlet area 50 through heat exchange unit 30. Fluid tubes 42 communicate with fluid inlet area 52 and fluid outlet area 54 so that fluid can flow from fluid inlet area 52 to fluid outlet area 54 through heat exchange unit 30.

Figure 2:
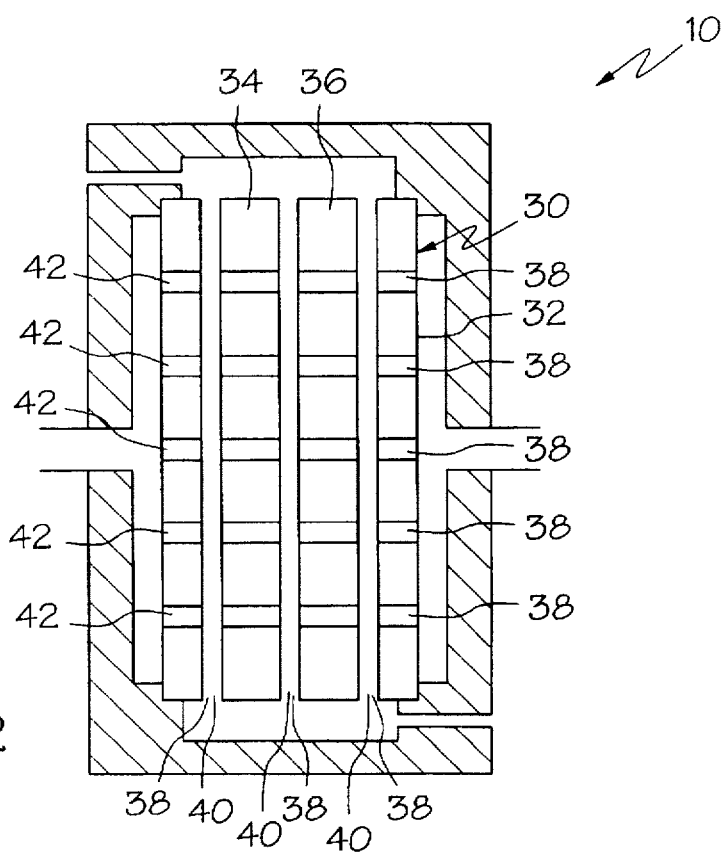
FIG. 2 presents a full cross sectional view of the cooling of this invention.

As shown in FIG. 2, shell 32 of heat exchange unit 30 contains a heat exchange material 34. Heat exchange material 34 is desirably a phase change material 36. Heat exchange unit 30 also includes a plurality of heat exchange conduits 38. The heat exchange material 34 is located between and around the heat exchange conduits 38 and is in intimate contact with the heat exchange conduits 38. Conduits 38 can be formed from any material which will allow heat transfer to occur through its surface. Desirably, conduits 38 are formed from a heat conductive material such as aluminum, copper or lead.

As shown in FIG. 2, a first plurality of heat exchange conduits 38 are tubes 40 for carrying coolant (hereinafter "coolant tubes 40") and a second plurality of heat exchange conduits 38 are tubes 42 for carrying the fluid to be cooled (hereinafter "fluid tubes 42"). Coolant tubes 40 are positioned generally vertically in shell 32 of heat exchange unit 30. Fluid tubes 42 are positioned generally horizontally in shell 32 of heat exchange unit 30 and essentially perpendicular to coolant tubes 40. A person of skill in the art will appreciate that, although coolant tubes 40 are described as being positioned vertically in shell 32 and fluid tubes 42 have been described as being positioned horizontally in shell 32, the terms "horizontally" and "vertically" are provided solely for reference to the figures and are not intended to limit the positioning of coolant tubes 40 and fluid tubes 42 in heat exchange unit 30. For example, coolant tubes 40 may alternately be a single tube helically disposed within shell 32 or a series of helical coils supplied by an inlet header and having an outlet header. Similarly, fluid tubes 42 may be a single tube helically disposed within shell 32 or a series of helical coils supplied by an inlet header and having an outlet header.

Figure 3:
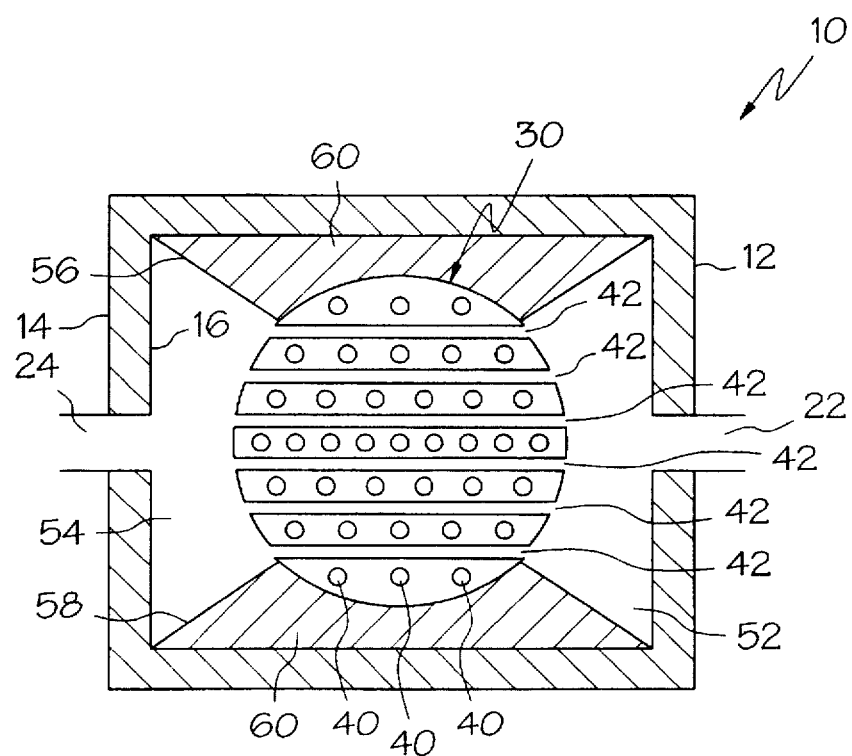
FIG. 3 presents a cross sectional view of the cooling unit of this invention taken along line 3—3 in FIG. 1.

A top cross sectional view of the cooling unit 10 is shown in FIG. 3. To prevent the fluid to be cooled from flowing around heat exchange unit 30 rather than through it by means of fluid tubes 42, the cooling unit 10 includes two retainers 56 and 58. Retainers 56 and 58 are positioned in cooling unit 10 to provide a barrier between the fluid inlet area 52 and fluid outlet area 54. This barrier prevents the warm fluid entering the cooling unit 10 from mixing with the cooled fluid which has passed through heat exchange unit 30. The size of retainers 56 and 58 may be reduced by making the radius of heat exchange unit 30 slightly smaller than the interior width of shell 12. Retainers 56 and 58 may be formed as part of shell 12 or may be independent pieces inserted into shell 12 during the manufacturing of the cooling unit 10. If retainers 56 and 58 are formed as part of shell 12, then they will desirably include an insulation material 60 positioned between their walls. The insulation material 60 will be the same material as that cited above for insulation material 26.

The cooling unit 10 functions in the following manner. A coolant is fed, typically by a mechanical pump or fan (not shown), into coolant inlet area 48 in shell 12 through coolant inlet 18. The coolant then flows through heat exchange unit 30 by means of coolant tubes 40. As the coolant travels through coolant tubes 40, the coolant cools the heat exchange material 34 by heat transfer through coolant tubes 40. The heat exchange material 34 then stores the cool, i.e., remains in a reduced temperature state. The coolant then exits heat exchange unit 30 flowing out of coolant tubes 40 and into coolant outlet area 50. From coolant outlet area 50, the coolant passes out of heat exchange unit 30 and exits cooling unit 10 through coolant outlet 20 in shell 12.

The fluid to be cooled is fed into cooling unit 10 through fluid inlet 22 and into fluid inlet area 52. Typically, the fluid is fed into fluid inlet area 52 by means of a conventional mechanical pump or a fan. The fluid then passes through heat exchange unit 30 by means of fluid tubes 42. As the fluid flows through heat exchange unit 30, the fluid is cooled by the transfer of heat from the fluid to the heat exchange material 34 through fluid tubes 42. The cooled fluid then leaves the heat exchange unit 30 by flowing out of fluid tubes 42 and into the fluid outlet area 54. From the fluid outlet area 54, the cooled fluid exits the cooling unit 10 through fluid outlet 24. Once the cooled fluid exits cooling unit 10, it is then ready for use. Such uses include cooling other objects, such as for example air; or being consumed, in the case of water for example. The fluid can also be used to cool other objects such as rooms or parts of machinery.

Practically any fluid can be cooled by the cooling unit 10 of this invention. The term "fluid" is used herein to mean any material or substance that changes shape or direction uniformly in response to an external force imposed upon it. The term includes gasses, liquids and finely divided solids.

As used herein, the term "coolant" means any liquid or gas having the property of absorbing heat from its environment and transferring that heat effectively away from its source.

Desirably, the coolant which is used to cool the heat exchange material 34 is selected from the group consisting of tap water, brine or refrigerants, such as those used in conventional air conditioning or refrigeration units. Useful refrigerants include, but are not limited to, ammonia and halogenated hydrocarbons. Desirably, the coolant is water supplied by a regular local water service, i.e., tap water.

In a desired aspect of the invention, the cooling unit 10 is used as an air conditioning unit. In this aspect of the invention, the fluid to be cooled is ambient air and the coolant is desirably tap water, i.e., water supplied by a municipal water source.

In this embodiment, the water, as the coolant, is circulated through the cooling unit 10 as described above. Typically, tap water is provided to a home, office or other building at a temperature of approximately 13° C. (55° F.). Because local water services supply water under pressure, no pumps are needed to move the water through the heat exchange unit 30. As the water moves through the heat exchange unit 30 by means of coolant tubes 40, the water cools the phase change material 36.

The water passes out of the heat exchange unit 30 and can be used for whatever purpose tap water is normally used.

Ambient air is circulated through the heat exchange unit 30 by means of a fan or air pump. The air passes through the heat exchange unit 30 in fluid tubes 42 and is cooled by heat transfer with the phase change material 36. After the air has been cooled, it is circulated throughout the building by the same fan or air pump or by additional fans and air pumps. Through the use of tap water as a coolant, the ambient air temperature can be reduced by the cooling unit 10 to a comfortable temperature.

Typically, that temperature will be from about 18° C. (65° F.) to about 21° C. (70° F.). is In an another version of this aspect of the invention, the coolant can be supplied to the cooling unit 10 by a conventional refrigeration unit such as the vapor compressor of a conventional air conditioning unit. This aspect of the invention functions as described above except that the coolant will be brine, ammonia or a halogenated hydrocarbon. Another difference is that the coolant is circulated back to the vapor compressor instead of being circulated throughout the building as the tap water normally is. The advantage of using a coolant supplied from a conventional refrigeration unit is that lower air temperatures can be obtained than could be obtained by using tap water as the coolant. This aspect of the invention conserves energy because the vapor compressor can be shut down while the phase change material cools the air which desirably is during time of peak power usage.

In this aspect of the invention, the heat exchange unit 30 may include an associated thermostat which controls the operation of the vapor compressor as a function of the temperature of the phase change material. Once the phase change material warms to a certain temperature, the vapor compressor is activated to cool the phase change material. After the phase change material is cooled to a desired temperature, the thermostat then deactivates the vapor compressor, thereby conserving energy.

To reduce the temperature of the fluid, the heat exchange material 34 will desirably have a temperature slightly higher than that of the coolant. Desirably, that temperature will be no more than 5° C. higher than the temperature of the coolant. The present invention makes use of phase change materials 36 to serve as the heat exchange material 34. The phase change materials 36 useful with this invention will have a latent heat greater than the sensible heat of liquid water. Desirably, they will have a heat capacity of at least about 25 cal/g.

The phase change materials 36 are cooled by the coolant and absorb heat from the object to be cooled when necessary. Phase change materials 36 may be repeatedly converted between solid and liquid phases to utilize their latent heats of fusion to absorb, store and release heat during such phase conversions. These latent heats of fusion are typically greater than the sensible heat capacities of water. For example, in phase change materials 36, the amount of energy absorbed upon melting or released upon freezing is much greater than the amount of energy absorbed or released upon increasing or decreasing the temperature of water over an increment of 10° C. In fact, phase change materials 36 can store and release approximately three to five times more thermal energy than water.

By using phase change materials to store and release cool, the temperature of the object cooled by the phase change material 36 can be controlled through selection of the phase change material 36 based upon its freezing/melting temperature. Upon melting and freezing, the phase change material 36 absorbs and releases substantially more energy per unit weight than a sensible heat storage material that is heated or cooled over the same temperature range. In contrast to a sensible heat storage material which absorbs and releases energy essentially on a thermocline over a broad temperature range, the phase change material 36 absorbs and releases a large quantity of energy in the vicinity of its melting/freezing point. Additionally, the temperature to which objects and fluids can be cooled is nearly constant and can be selected to be in a temperature range appropriate for the object or fluid to be cooled. Useful phase change materials 36 will have melting/freezing temperatures from about −10° C. to about 20° C. to efficiently cool objects. For example, if cooling unit 10 is used as an air conditioning unit to cool ambient air, then the phase change materials 36 can be selected so that the ambient air temperature will provide a comfortable environment. If the cooling unit 10 is used as an air conditioner, a comfortable air temperature is approximately 20° C. (68° F.), thus a phase change material having a melting temperature slightly lower than 20° C. (68° F.) would be ideal. Desirably, the phase change materials will have a melting/freezing temperature of about 15° C. to about 20° C. In situations where higher temperatures are desired, then phase change materials with higher freezing/melting temperatures could be used. Conversely, in situations where lower temperatures are desired, then phase change materials with lower freezing/melting temperatures could be used.

One phase change material 36 which can be used as the heat exchange material 34 is a composite phase change material such as that disclosed in U.S. Pat. No. 5,565,132 entitled "Thermoplastic, Moldable, Non-extruding Phase Change Materials" of which I am the inventor and which is hereby incorporated by reference in its entirety. In its most basic form, this phase change material is a solidified melt mixture of a polyolefin resin, an ethylene copolymer, silica particles, and an alkyl hydrocarbon phase change material.

The polyolefin resin is desirably a high-density polyethylene (HDPE) or polypropylene having a molecular weight or melt index in the range of 0.5 to 5 decigrams/minute. Examples of useful high density polyethylenes are Marlex 6006 and Alathon 6210 from Phillips Chemical Co., Bartlesville, Okla. and Occidental Chemical Company, Niagara Falls, N.Y., respectively. The HDPE, when it cools from the melt, establishes a matrix within which the lower melting phase change material can melt and freeze without changing the volume of the composite significantly. Thus, the melting temperature of the polyolefin must be well above the highest temperature that will be encountered in use. For this reason, commercial low-density polyethylenes are less desirable though not without some utility. It also is possible to substitute a higher melting polypropylene for HDPE, which may be a decided advantage in some applications, although processing is more difficult.

The ethylene copolymer serves a compatibilizing bridge between the low molecular weight phase change material and the high molecular weight, high melting HDPE or polypropylene. The ethylene copolymer is desirably an ethylene-vinyl acetate copolymer containing approximately 10–20% by weight vinyl acetate, but may also be an ethylene-methyl acrylate copolymer, an ethylene-ethyl acrylate copolymer, or equivalent molar copolymer. A series of ethylene-vinyl acetate (EVA) copolymers containing from 5 to 28% wt. of vinyl acetate were tested for compatibility and their ability to reduce oozing of the phase change material. As a result, copolymers in the range of 10–20% wt. of vinyl acetate are desired and those containing about 15–17% wt. vinyl acetate most desired. Generally, comparable compatibility and non-oozing could be obtained in melt-mixed blends wherein equivalent quantities of ethylene/methyl acrylate (EMA), or ethylene/ethyl acrylate (EEMA) are substituted for EVA.

The silica in the composite phase change material is added to tie up the low-melting phase change material in a stable gel to further prevent oozing. The amount of silica is, therefore, directly related to the amount of the phase change material and should be about 10–30 wt. % of the phase change material. The silica particles are desirably precipitated silica particles having a surface area of from 50 to 500 square meters per gram and primary particle sizes of from 0.005 to 0.025 microns. One useful silica is ABS precipitated silica from PPG Industries Inc., of Pittsburgh, Pa., which is a normal, hydrophilic silica with a surface area of 150 $m^2$/gram and a particle size of about 0.022 microns. However, other precipitated silica having a comparable particle size and surface area would work equally as well. Fumed silicas of comparable or smaller particle size and equal or greater surface area should also be satisfactory, but are much more expensive.

Another useful silica is a precipitated or fumed silica which has been surface treated with silane coupling agents or silicone resins to provide a hydrophobic surface which renders the silica unaffected by water or relatively high humidity. Hydrophobic silica is desired because it also more receptive to the alkyl hydrocarbon phase change material.

Substantially any phase change material can be used which is compatible with the polyolefin. In many cases, compatible phase change materials will be characterized by long, linear alkyl hydrocarbon chains comprising their molecular structure. Desirable phase change materials are crystalline organic compounds such as linear crystalline alkyl hydrocarbons, crystalline fatty acids, crystalline fatty acid esters, crystalline 1-olefins, crystalline 1-halides, crystalline primary alcohols, crystalline alicyclic hydrocarbons, and crystalline aromatic hydrocarbons which melt and freeze within the desired thermal transfer temperature range of about −10° C. to about 20° C. More desirably, if the cooling unit 10 is to be used as an air conditioning unit, the phase change materials 36 useful with the melt mix polymer will be selected from the group consisting of decane, undecane, dodecane, tridecane, tetradecane, pentadecane, hexadecane, heptadecane, octadecane, nonadecane, eicosane and mixtures thereof.

For the melt mix composition, the thermal storage depends upon the linear alkyl hydrocarbon component. If a "pure" linear alkyl hydrocarbon is used the thermal storage ability is 60 cal/g, but if an impure hydrocarbon is used, the thermal storage drops to 40–45 calories per gram. The term "pure" is used herein to mean that the carbon chain length is comprised of molecules of essentially single carbon chain length and without any branches. Thus, a 100% pure hydrocarbon would be a straight chain hydrocarbon, such as $C_{16}$, having no branches. If the concentration of the hydrocarbon is 60% of the melt mix composition, then the energy storage will be equivalent to 60% of the thermal storage ability of the linear alkyl hydrocarbon component.

The phase change materials useful with the composite phase change material may also be used as the heat exchange material 34 without any additional components. Useful phase change materials will desirably be characterized by a long, linear alkyl hydrocarbon chains comprising their molecular structure. Desirable phase change materials are selected from the group consisting of linear crystalline alkyl hydrocarbons, crystalline fatty acids, crystalline fatty acid esters, crystalline 1-olefins, crystalline 1-halides, crystalline primary alcohols, crystalline alicyclic hydrocarbons, and crystalline aromatic hydrocarbons. These materials melt and freeze within the desired thermal transfer temperature range of about −10° C. to about 20° C. More desirably, if the cooling unit 10 is to be used as an air conditioning unit, the phase change materials 36 will be selected from the group consisting of decane, undecane, dodecane, tridecane, tetradecane, pentadecane, hexadecane, heptadecane, octadecane, nonadecane, eicosane and mixtures thereof.

Optionally, silica can advantageously be used to increase the viscosity of the above listed phase change materials 36 to impart a gel-like structure to the phase change material 36. The silica will typically be present in an amount from about 5 weight percent to about 35 weight percent of the weight of the phase change material 36. Desirably, the silica will be present in an amount of about 20 weight percent to about 25 weight percent of the phase change material 36. Useful silicas are the same as those disclosed above.

Another useful phase change material 36 is a dry powder mixture comprising a phase change material such as those dry powder mixtures disclosed in U.S. Pat. Nos. 5,106,520; 5,211,949; 5,254,380; and 5,282,994, all of which are entitled "Dry Powder Mixes Comprising Phase Change Materials." All of these patents are hereby incorporated by reference in their entireties. In these mixtures, a free flowing powder is obtained when the phase change material and the silica are mixed at a ratio of 70/30 % wt. of phase change material to silica.

Another phase change material 36 useful with this, invention is polyethylene glycol. Polyethylene glycols (PEG) are a series of lower molecular weight analogues to polyethylene oxides. The melting temperature of PEGs increases with increasing molecular weight. For example, the melting point of a polyethylene glycol polymer with a molecular weight of 300 m.w.u. is approximately −10° C. and PEGs with a molecular weight of greater than 8,000 m.w.u. have a melting point which levels out at about 60° C. Useful PEGs can be chosen dependent upon the desired temperature range in which the phase change material will be used. The thermal energy storage of PEGs also increases slightly with increasing molecular weight but levels out at approximately 40 calories per gram at molecular weights above 5,000 m.w.u. The thermal energy storage of PEGs useful with invention averages about 35 cal/g. Optionally, silica can be used to increase the viscosity of the PEG and impart a gel-like structure to low viscosity PEG polymers. The silica will typically be present in an amount from about 5 weight percent to about 35 weight percent of the weight of PEG. Useful silicas are the same as those disclosed above. Because of the hygroscopic nature of lower molecular weight polyethylene glycols, the heat exchange unit 30 must be completely sealed to prevent the introduction of moisture to the polyethylene glycol.

Because each polyethylene glycol molecule has two terminal hydroxyl groups, PEGs can be reacted with polyfunctional isocyanates to produce urethane polymers which retain the crystalline melting temperature and thermal storage characteristics of the PEG. PEGs crosslinked with polyfunctional isocyanates do not exhibit a melt flow above the crystalline melting point of the PEG component. If the PEG is reacted with a polyfunctional isocyanate, the PEG will desirably constitute about 60% to about 70% of the resultant polymer.

Still another useful phase change material 36 is a water-silica dry powder comprising a 64/32 mixture of water to silica. This dry powder has a freezing/melting temperature of about 0° C. (32° F.). Another useful phase change material 36 is a mixture of water, urea and silica which has a freezing/melting temperature of about −8° C. (18° F.). Typically, the water, urea and silica are mixed in a ratio of about 61.2/20.5/18.3% wt. of water to urea to silica.

Finally, other phase change materials, such as water-calcium chloride, water-sodium chloride and ethylene glycol may also be used as the phase change material 36. As with the phase change materials 36 described above, silica can advantageously be used to increase the viscosity of these phase change materials to impart a gel-like structure. The silica will typically be present in an amount from about 5 weight percent to about 35 weight percent of the weight of the phase change material. Useful silicas are the same as those disclosed above.

Because the cooling unit 10 makes use of phase change materials, such as phase change materials 36, to cool fluids, the cooling unit 10 will consume less energy than conventional units. The cooling unit 10 consumes less energy because the coolant does not have to be constantly circulated throughout the unit to cool the desired fluid. Rather, the phase change material 38 stores the "cool" provided by the coolant so that the fluid can be cooled at times when the coolant is not being circulated. Thus, it not necessary to constantly expend energy circulating the coolant throughout the cooling unit 10. This is particularly advantageous because the cooling unit 10 can include an associated timer which shuts off power to the pump or fan which circulates the coolant so that the cooling unit 10 does not consume energy during peak hours of energy usage. The timer can be set so that the coolant is only circulated during off-peak hours of energy usage, thus, reducing energy costs.

The energy savings of the cooling unit 10 is further improved if the coolant used is tap water. In this instance, no compressor unit is necessary so even less energy is consumed by the cooling unit 10. The only energy expended by the cooling unit 10 in this case is the energy needed to run an air pump or fan to force the fluid through the cooling unit 10 and, if the fluid is air, throughout the building.

While certain representative embodiments and details have been shown for purposes of illustrating the invention, it will be apparent to those skilled in the art that various changes in the compositions and apparatus disclosed herein may be made without departing from the scope of the invention, which is defined in the appended claims.

What is claimed is:

1. A cooling unit comprising:
   a phase change material selected from the group consisting of a melt mix polymer, linear crystalline alkyl hydrocarbons, crystalline fatty acids, crystalline fatty acid esters, crystalline 1-olefins, crystalline 1-halides, crystalline primary alcohols, crystalline alicyclic hydrocarbons, and crystalline aromatic hydrocarbons;
   a heat exchange unit which contains said phase change material;
   a first plurality of heat exchange conduits positioned in said heat exchange unit, said first plurality of heat exchange conduits in heat transfer relation with said phase change material so that said phase change material can be cooled by a coolant; and
   a second plurality of heat exchange conduits positioned in said heat exchange unit, said second plurality of heat exchange conduits in heat transfer relation with said phase change material so that said phase change material can cool an object.

2. The cooling unit of claim 1 further including a coolant in said first plurality of heat exchange conduits.

3. The cooling unit of claim 2 wherein said coolant is selected from the group consisting of tap water, brine and a refrigerant.

4. The cooling unit of claim 1 further comprising a fluid inlet positioned on a first side of said heat exchange unit and a fluid outlet positioned on a second side of said heat exchange unit said fluid inlet and said fluid outlet being positioned so that a fluid can flow through said heat exchange unit from said first side to said second side.

5. The cooling unit of claim 4 further comprising a coolant inlet positioned on a third side of said heat exchange unit and a coolant outlet positioned on a fourth side of said heat exchange unit, said coolant inlet and said coolant outlet being positioned so that coolant can flow through said heat exchange unit from said third side to said fourth side.

6. The cooling unit of claim 1 further including an insulation material having an "R" value of at least about 10.

7. The cooling unit of claim 6 wherein said insulation material has an "R" value of at least about 25.

8. The cooling unit of claim 1 wherein the phase change material is a linear crystalline alkyl hydrocarbon having a phase change temperature which is about 5° C. higher than that of the coolant.

9. The cooling unit of claim 1 wherein said phase change material is melt mix polymer comprising a phase change material, a polyolefin, an ethylene copolymer and silica particles.

10. The cooling unit of claim 9 wherein said melt mix polymer comprises, by weight of total composition, about 60% phase change material, from about 16% to about 22% polyolefin, from about 8% to about 12% ethylene copolymer, and from about 8% to about 16% silica particles.

11. The cooling unit of claim 10 wherein said phase change material is a linear crystalline alkyl hydrocarbon.

12. The cooling unit of claim 11 wherein said linear crystalline alkyl hydrocarbon is selected from the group consisting of decane, undecane, dodecane, tridecane, tetradecane, pentadecane, hexadecane, heptadecane, octadecane, nonadecane, eicosane and mixtures thereof.

13. The cooling unit of claim 1 wherein said phase change material is selected from the group consisting of decane, undecane, dodecane, tridecane, tetradecane, pentadecane, hexadecane, heptadecane, octadecane, nonadecane, eicosane and mixtures thereof.

14. The cooling unit of claim 1 wherein the phase change material has thermal energy capacity of at least about 25 cal/g.

15. The cooling unit of claim 1 wherein said phase change material has a melting temperature from about −10° C. to about 20° C.

16. An air conditioning unit for cooling air comprising:
   a shell;
   an insulation material positioned to insulate said shell;
   a heat exchange unit positioned in said shell such that a coolant inlet, a coolant outlet, a fluid inlet and a fluid outlet are provided by the positioning of said heat exchange unit in said shell;

a phase change material contained in said heat exchange unit, said phase change material being selected from the group consisting of a melt mix polymer, linear crystalline alkyl hydrocarbons, crystalline fatty acids, crystalline fatty acid esters, crystalline 1-olefins, crystalline 1-halides, crystalline primary alcohols, crystalline alicyclic hydrocarbons, and crystalline aromatic hydrocarbons;

a first plurality of heat exchange tubes positioned in said heat exchange unit, said tubes communicating with said coolant inlet and with said coolant outlet, and said tubes being in heat transfer relation with said phase change material so that said phase change material can be cooled by a coolant as said coolant is passed through said first plurality of tubes; and a second plurality of heat exchange tubes positioned in said heat exchange unit, said tubes communicating with said fluid inlet and with said fluid outlet, and said tubes being in heat transfer relation with said phase change material so that said phase change material can cool ambient air as said air is passed through said second plurality of tubes.

17. The air conditioning unit of claim 16 wherein said insulation material has an "R" value of at least about 10.

18. The air conditioning unit of claim 17 wherein said phase change material is a melt mix polymer comprising a phase change material, a polyolefin, an ethylene copolymer and silica particles.

19. The air conditioning unit of claim 18 wherein said melt mix polymer comprises, by weight of total composition, about 60% phase change material, from about 16% to about 22% polyolefin from about 8% to about 12% ethylene copolymer, and from about 8% to about 16% silica particles.

20. The air conditioning unit of claim 16 wherein said phase change material is a linear crystalline alkyl hydrocarbon having a phase change temperature which is about 5° C. higher than that of the coolant.

21. The air conditioning unit of claim 16 further including a coolant in said first plurality of heat exchange conduits.

* * * * *